3,293,183
DEVELOPER FOR ELECTROSTATIC IMAGES
Josef Matkan, Malvern, South Australia, Australia, assignor to Research Laboratories of Australia Limited, Adelaide, South Australia, Australia
No Drawing. Filed Aug. 8, 1962, Ser. No. 215,531
Claims priority, application Australia, Aug. 14, 1961, 8,036/61
2 Claims. (Cl. 252—62.1)

This invention relates to improved developer for electrostatic images and in particular it relates to a developer of the general type in which pigment particles are suspended in the liquid of relatively high electrical resistivity so that the particles can move to the image areas under control of the electrostatic attraction.

With developers of this nature, or toners as they are often called, it is highly desirable to achieve stability in the developer to allow an adequate storage time without deterioration, but it is more important still to be able to fix the toners to the image areas in a short time without danger of smudging or scuffing.

The object of this invention is to provide an improved formulation which will ensure that adequate and quick fixing of the toner particles will result, coupled with stability of the developer prior to use, and this is achieved by using in the carrier liquid for the toner particles a hydrocarbon soluble cellulose polymer or polymers either with or without a silicone resin.

In bringing the invention into effect, toner particles such as black iron oxide are suspended in a suitable liquid to which is also added a hydrocarbon soluble cellulose polymer such as ethyl cellulose or ethyl hydroxy ethyl cellulose or a combination of these, and if higher rate of resin deposition is required in certain carrier liquids, the liquid may also have a silicone resin added thereto for improved effects.

It has been found that the hydrocarbon soluble cellulose and silicone polymers give a highly effecting fixing of the pigment particles.

The cellulose polymers are inert, have a wide range of compatibility, their peculiar solubility characteristic promotes stabilisation of suspensions and they retain adhesiveness when in gel form. A special feature of celluloses is the property to hold out on porous surfaces. This is of particular importance because due to this characteristic no or very little absorption into the photoconductive surface takes place and most of the deposited cellulose or of any other resin co-deposited with a cellulose polymer is available as binder for the image forming pigment particles. All these features make them very attractive as single components in a toner, or, in combination with some other resin, which when co-depositing with the cellulose is made to fix more effectively by being retained together with some of the strong solvent at the image areas within the cellulose gel. Ethyl hydroxy ethyl cellulose is used in these toners, mainly for these purposes and to assist dispersion as intermediate, whereas ethyl cellulose is used purely as fixing resin and as accelerator in image formation.

The silicones have been used in some of these toners because their presence introduces certain desirable features when used with cellulose, such as improved fixing, faster image formation and the like because they are not considered to be reactive with celluloses and because no instability of toners due to silicone components has yet been observed. All formulations are based here on Dow Corning silicone resins but other silicone resins may be used.

*Example 1*

Blue toner suitable for use in non-inflammable carrier fluids with high solvent power, such as perchloroethylene.

|  | G. |
|---|---|
| Phthalocyanine Blue | 10 |
| Ethyl cellulose (7.5% solution in Solvesso 100) | 80 |

The pigment should be dispersed in the resin solution by any known method and the paste thus obtained should be diluted by gradual addition of 5 parts by weight of perchloroethylene to one part of paste. This concentrate can be now dispersed in perchloroethylene in any concentration to suit the method of developing preferred.

*Example 2*

Black toner suitable for use in non-inflammable carrier fluids with medium solvent power, such as in a vehicle composed of 6 parts of perchloroethylene and 4 parts of n-hexane, by weight.

|  | G. |
|---|---|
| Black iron oxide | 20 |
| Ethyl cellulose (7.5% solution in Solvesso 100) | 100 |

The pigment should be dispersed in the resin solution by any known method and the paste thus obtained should be diluted by gradual addition of 5 parts by weight of perchloroethylene to one part of paste. This concentrate can be now dispersed in the above stipulated vehicle fluid in any concentration to suit the method of developing preferred.

*Example 3*

Black toner suitable for use in high boiling point solvents which have a KB value of not less than 90 and which have a slow rate of evaporation, such as Solvesso 100.

|  | G. |
|---|---|
| Carbon black | 10 |
| Ethyl cellulose (7.5% solution in Solvesso 100) | 150 |

The pigment should be dispersed in the resin solution by any known method and the paste thus obtained should be diluted by gradual addition of 5 parts by weight of Solvesso 100 to one part of paste. This concentrate can be now dispersed in Solvesso 100 in any concentration to suit the method of developing preferred.

*Example 4*

Black toner suitable for use in medium solvent power vehicle fluids.

|  | G. |
|---|---|
| Black iron oxide | 20 |
| Phthalocyanine Blue | 0.1 |
| Ethyl cellulose (7.5% solution in Solvesso 100) | 60 |
| Ethyl hydroxy ethyl cellulose (10% solution in Solvesso 100) | 20 |

The pigments should be dispersed in the mixture of the resin solutions by any known method and the paste thus obtained should be diluted by gradual addition of 6 parts by weight of Solvesso 100 to one part of paste. This concentrate can be now dispersed in n-Heptane in any concentration to suit the method of developing preferred.

Example 5

Black toner suitable for use in medium solvent power carrier fluids.

| | G. |
|---|---|
| Black iron oxide | 20 |
| Phthalocyanine Blue | 0.05 |
| Ethyl hydroxy ethyl cellulose (10% solution in Solvesso 100) | 30 |
| Silicone resin R–840 | 40 |

The pigments should be dispersed in the resin mixture by any known method and the paste thus obtained should be diluted by gradual addition of 5 parts by weight of Solvesso 100 to one part of paste. This concentrate can be now dispersed in medium solvent power fluid, such as cyclohexane, in any concentration to suit the method of developing preferred.

Example 6

Black toner suitable for use in medium solvent power carrier fluids.

| | G. |
|---|---|
| Black iron oxide | 10 |
| Phthalocyanine Blue | 0.05 |
| Ethyl hydroxy ethyl cellulose (10% solution in Solvesso 100) | 30 |
| Ethyl cellulose (7.5% solution in Solvesso 100) | 10 |
| Silicone resin R–6–0031 | 20 |

The pigments should be dispersed in the resin mixture by any known method and the paste thus obtained should be diluted by gradual addition of 5 parts by weight of perchloroethylene to one part of paste. This concentrate can be now dispersed in medium solvent power fluids, such as a mixture of 6 parts of perchloroethylene to 4 parts of Shell X4 solvent. The concentration is to be determined by the method of developing preferred.

Example 7

Black toner suitable for use in low solvent power carrier fluids.

| | G. |
|---|---|
| Carbon black | 10 |
| Ethyl hydroxy ethyl cellulose (10% solution in Solvesso 100) | 100 |
| Silicone resin R–671 | 50 |

The pigment should be dispersed in the resin mixture by any known method and the paste thus obtained can be suspended in low solvent power carrier fluids, such as Shell X55 of n-hexane.

Example 8

Blue toner suitable for use in medium to low solvent power carrier fluids. This formulation illustrates the use of cellulose polymers as an additive to oleo-resinous base toners to obtain scuff-free images.

| A= | G. |
|---|---|
| Phthalocyanine Blue | 50 |
| Alumina hydrate | 15 |
| Heat bodied linseed oil | 60 |
| Calcium naphthenate | 2 |

This toner does not afford any fixation. To obtain a scuff-free image, the following procedure is recommended:

| B= | Parts |
|---|---|
| Compound A | 1 |
| Ethyl hydroxy ethyl cellulose (10% solution in Solvesso 100) | 1.5 |
| Ethyl cellulose (7.5% solution in Solvesso 100) | 1 |

The ingredients in compound B should be mixed by stirring and then diluted with 5 parts of Solvesso 100. This toner can be dispersed in fluids such as Shell X55.

Example 9

Green toner suitable for use in medium to high solvent power carrier fluids. It illustrates the use of cellulose polymers as additives to alkyd base toners to obtain scuff-free images and to adapt such toners for use in high solvent power fluids, such as perchloroethylene.

| A= | G. |
|---|---|
| Irgalite Vivid Green M | 20 |
| Lumogene Light Green | 30 |
| Alumina hydrate | 30 |
| Rhodene PC2/70 | 80 |
| Calcium naphthenate 3% | 3 |

This toner cannot be used in high solvent power fluids and fixing properties are not adequate. To obtain a scuff-free image in a non-inflammable liquid, the following procedure is suggested.

| B= | Parts |
|---|---|
| Compound A | 1 |
| Ethyl hydroxy ethyl cellulose (10% solution in Solvesso 100) | 1.5 |
| Ethyl cellulose (7.5% solution in Solvesso 100) | 1 |

The ingredients in Compound B should be mixed together. This concentrate can be dispersed in high solvent power fluids, such as perchloroethylene.

Example 10

Resin developer for use in low solvent power fluids. The images are transparent, scuff-free and very high resolution is obtainable since no distinct particulate matter is present in the image forming compound. The image areas are water repellant and acid resistant.

| | G. |
|---|---|
| Ethyl hydroxy ethyl cellulose (10% solution in Solvesso 100) | 4 |
| Silicone resin R–840 | 2.5 |
| Solvesso 100 | 50 |

The ingredients should be mixed by stirring. One part of this concentrate can be diluted with 10 parts of Shell X55 solvent to obtain a developer fluid.

The trademarks and registered trademarks used in this specification are identified as follows:

Irgalite Vivid Green M. A double salt complex toner, manufactured by Geigy.

Lumogene Light Green. A luminescent green organic pigment, manufactured by Badische Anilin and Soda Fabrik.

Rhodene PC2/70. Linseed oil base oxidizing type long oil alkyd. Specific gravity 0.97, 70% oil, acid value 6–10. Manufactured by Polymer Corporation.

Shell X4. A hydrocarbon solvent manufactured by the Shell Company.

| Specific gravity | .620 |
|---|---|
| KB value | 30 |

Shell X55. A hydrocarbon solvent manufactured by the Shell Company.

| Specific gravity | .720 |
|---|---|
| KB value | 40 |

Silicone resins. (1) R–840, R–6–0031, R–671 manufactured by Dow Corning Corp.

Solvesso 100. A hydrocarbon solvent manufactured by Standard Oil Company.

| Specific gravity | .876 |
|---|---|
| KB value | 92 |

What I claim is:

1. For developing electrostatic images a developer consisting essentially of an electrically insulating hydrocarbon carrier liquid having a volume resistivity in excess of $10^9$ ohm cm., pigment particles suspended in said carrier liquid and also dispersed in said carrier liquid a cellulose polymer but which is substantially soluble in a hydrocarbon solvent which is miscible with said carrier liquid and which has a KB value in excess of 90.

2. An improved liquid developer according to claim 1 characterized in that the cellulose polymer is selected from the group consisting of ethyl cellulose and ethyl hydroxy ethyl cellulose.

References Cited by the Examiner

UNITED STATES PATENTS 2,758,939  8/1956  Sugarman _____ 252—62.1 X
2,907,674  10/1959  Metcalfe et al. ____ 252—62.1 X

OTHER REFERENCES

"Modocoll—Water-Soluble Cellulose Ethers," Mo Och Domsjo Aktiebolag, Kemiska Industrierna, July 1952, pages 3–5, 47 and 53.

LEON D. ROSDOL, *Primary Examiner*.

JULIUS GREENWALD, *Examiner*.

R. D. LOVERING, *Assistant Examiner*.